United States Patent [19]
Shepard et al.

[11] Patent Number: 5,107,100
[45] Date of Patent: * Apr. 21, 1992

[54] PORTABLE SCANNER WITH ON-BOARD KEYBOARD, DISPLAY, TRANSCEIVER AND PRINTER

[75] Inventors: Howard M. Shepard, Great River; Edward Barkan, Setauket; Jerome Swartz, Old Field, all of N.Y.

[73] Assignee: Symbol Technologies, Inc., Bohemia, N.Y.

[*] Notice: The portion of the term of this patent subsequent to Jul. 19, 2005 has been disclaimed.

[21] Appl. No.: 610,648

[22] Filed: Nov. 8, 1990

Related U.S. Application Data

[60] Continuation-in-part of Ser. No. 272,545, Nov. 17, 1988, which is a division of Ser. No. 148,555, Jan. 26, 1988, Pat. No. 4,845,350, which is a division of Ser. No. 883,923, Jul. 10, 1986, Pat. No. 4,758,717, which is a division of Ser. No. 519,523, Aug. 1, 1983, Pat. No. 4,673,805, which is a division of Ser. No. 342,231, Jan. 25, 1982, Pat. No. 4,409,476.

[51] Int. Cl.⁵ .............................................. G06K 7/10
[52] U.S. Cl. ................................... 235/472; 235/462
[58] Field of Search ................................. 235/462, 472

[56] References Cited

U.S. PATENT DOCUMENTS 4,251,798  2/1981  Swartz et al. ............... 235/472 X
4,758,717  7/1988  Shepard et al. ............. 235/462 X

*Primary Examiner*—David Trafton

[57] ABSTRACT

A scanning head includes a keyboard and a display respectively mounted at rear and front regions of the head. An outgoing laser beam exits a window positioned between the keyboard and the display, and travels over the display. A transceiver and a printer are also mounted on the head.

18 Claims, 3 Drawing Sheets

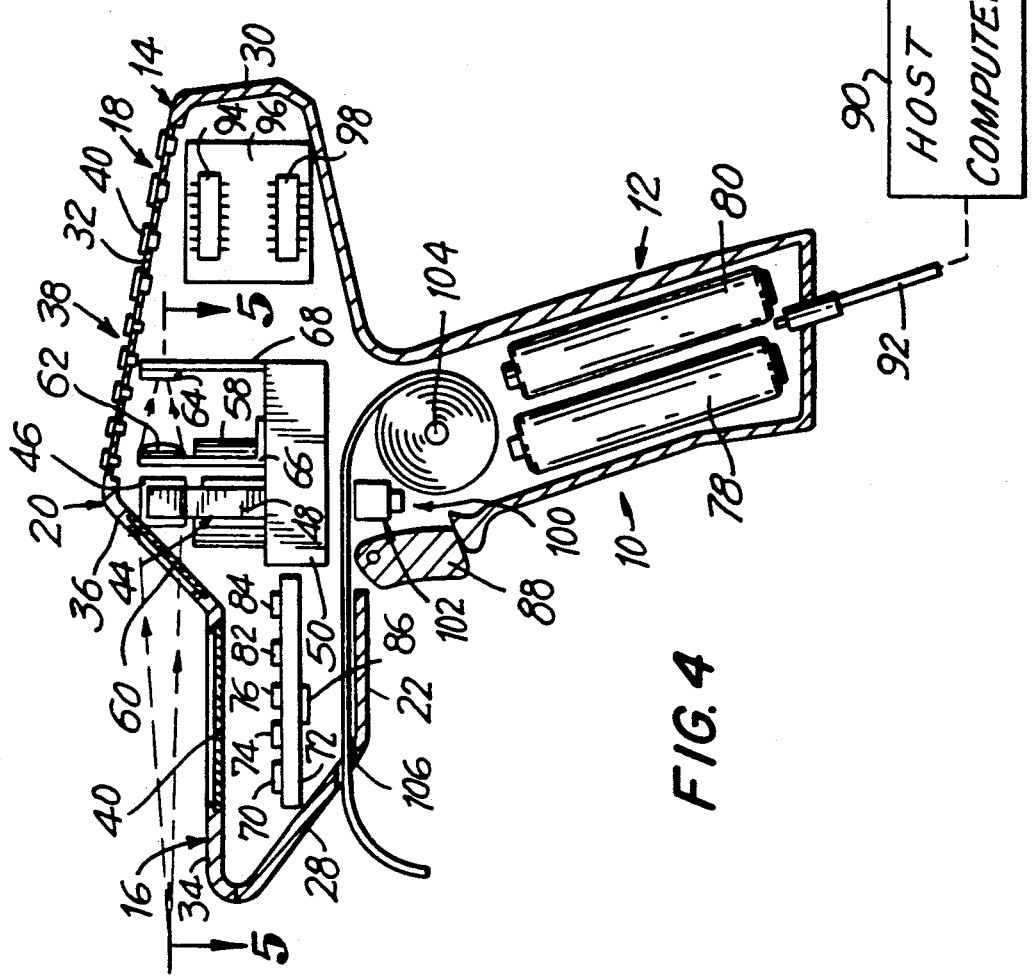
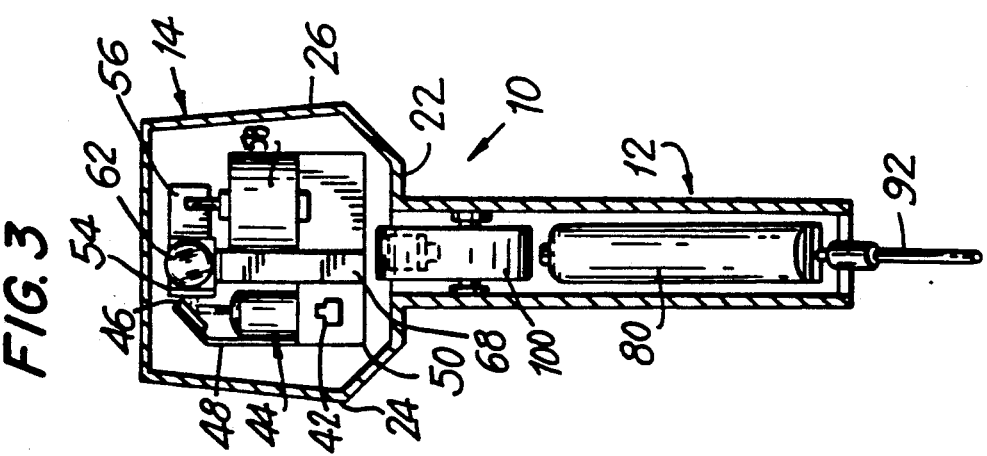

PORTABLE SCANNER WITH ON-BOARD KEYBOARD, DISPLAY, TRANSCEIVER AND PRINTER

CROSS-REFERENCE TO RELATED CASES

This application is a continuation-in-part of pending application Ser. No. 272,545, filed Nov. 17, 1988, which was a division of application Ser. No. 148,555, filed Jan. 26, 1988 (now U.S. Pat. No. 4,845,350, issued July 4, 1989) which was a division of application Ser. No. 883,923, filed July 10, 1986 (now U.S. Pat. No. 4,758,717, issued July 19, 1988), which was a divison of application Ser. No. 519,523, filed Aug. 1, 1983 (now U.S. Pat. No. 4,673,805, issued June 16, 1987), which was a division of application Ser. No. 342,231, filed Jan. 25, 1982 (now U.S. Pat. No. 4,409,470, issued Oct. 11, 1983).

This application discloses subject matter disclosed in application Ser. No. 519,107 filed Aug. 1, 1983 (now U.S. Pat. No. 4,460,120 issued July 7, 1984), which was also a division of said application Ser. No. 342,231. And further, this application discloses- subject matter disclosed in application Ser. No. 831,415, filed Feb. 20, 1986 (now U.S. Pat. No. 4,736,095, issued Apr. 5, 1988), which was a division of said application Ser. No. 519,523, which was a division of said application Ser. No. 342,231.

This application discloses subject matter disclosed in application Ser. No. 374,452, (now U.S. Pat. No. 5,029,183) filed June 29, 1989 and in application Ser. No. 334,130, filed Apr. 6, 1989 (now U.S. Pat. No. D320,013).

BACKGROUND OF THE INVENTION

1. Field of the Invention

This invention generally relates to laser scanning systems for reading coded indicia, such as bar code symbols, and, more particularly, to a hand-held laser scanning head having an on-board keyboard, an on-board display, an on-board printer and an on-board radio transceiver, preferably using spread spectrum technology to enable the head to communicate electronically to and from a remote site.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically decode the symbol to multiple alpha-numerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361 and 4,387,297, all of which have been assigned to the same assignee as the instant application.

It is generally known to emit light beam from a hand-held, portable scanning head supported by an operator, and to aim the head and, more particularly, the light beam, at a symbol to be read. The light beam is preferably a laser beam generated by a gas or semiconductor laser source. An optical train directs the laser beam along a light path, and focuses the laser beam to a scan spot at a reference plane, typically located remotely from the head. At least a portion of the laser beam reflected off the symbol located in the vicinity of the reference plane is collected and detected over a field of view by a sensor on-board the head. A scanning component sweeps either the scan spot in a scan across the symbol, or sweeps the field of view. The sensor generates electrical analog signals indicative of the symbol. The analog signals are converted into digital signals, and then decoded into data representative of the symbol, and thereupon, conducted to a remote site such as a host computer, for further processing. Reading of the symbol is initiated by a manually actuatable trigger. The system determines when the symbol has been successfully decoded and read, and then automatically terminates the reading.

Keyboards for manual data entry are useful components in such systems. Keyboards comprised of multiple keys require a great deal of space, and are typically mounted remotely from the head, or are mounted on the head but a location awkward for the operator. If the keyboard was mounted on the barrel or body portion of the head in front of a window through which the outgoing light beam passes, the operator's fingers and hand would intercept the outgoing light beam in the event the operator worked the keyboard during symbol reading. If the window allowed reflected light to pass therethrough en route to the sensor, then the operator's fingers and hand would also block that reflected light, again interfering with the reading operation. The keyboard could also be mounted on a terminal unit that is detachably mounted on a handle of the head.

Displays for displaying information are also useful components in such systems. Typically, indicator lights are used as displays to signal the operator. When displays are fashioned as one or more screens, they occupy a great deal of space. This is not a problem for contact devices of the type disclosed in U.S. Pat. No. 4,251,798, where space is available, but is a problem for hand-held, non-contact-type scanning heads where available space is at a premium. Often, such displays are mounted on separate terminal units mounted remotely from, or attachable to, the head.

The art proposed in U.S. Pat. No. 4,628,193 mounting a keyboard, a display and a printer on a hand-held electronic apparatus in connection with a parcel delivery service, a hospital medication program and a blood sample identification system.

SUMMARY OF THE INVENTION

1. Objects of the Invention

It is a general object of this invention to mount a display and a keyboard together on-board a scanning head for reading indicia.

Another object of this invention is to enable an operator to work the keyboard without interfering with indicia reading.

An additional object of this invention is to enable an operator to see the display without interfering with the indicia reading.

Still another object of this invention is to provide a compact, integrated, hand-held, laser scanning head with on-board data entry and informational displays, as well as on-board transmission and reception of electrical signals and printing of labels.

2. Features of the Invention

In keeping with these objects and others which will become apparent hereinafter, one feature of the invention resides, briefly stated, in a hand-held laser scanning head in a laser scanning system for reading indicia, e.g., symbols, at which the head is aimed. Several components are mounted in the head. For example, means, e.g., a semiconductor laser diode or a gas laser, are provided within the head for generating an incident laser beam. Optic means, e.g., focusing lenses, aperture stops, reflecting mirrors, or other optical elements, are also provided within the head for optically modifying, i.e., forming the beam to a scan spot, and directing the incident laser beam along a first optical path toward a reference plane located exteriorly of the head and lying in plane generally perpendicular to the direction of propagation of the incident laser beam, and to a symbol located in a working distance range in the vicinity of the reference plane.

Laser light is relected off the symbol, and at least a returning portion of said reflected laser light travels along a second optical path away from the symbol back towards the head. Scanning means, e.g. a scanning motor having a reciprocally-oscillatable output shaft on which a reflecting surface such as a scanning mirror is mounted, are mounted in the head for scanning the symbol in a scan, and preferably at a plurality of sweeps per second, across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The head also comprises sensor means, e.g. one or more photodiodes, for detecting the variable light intensity of the returning portion of the reflected laser light over a field of view, and for generating an electrical analog signal indicative of the detected variable light intensity. Signal processing means are also mounted in the head for processing the analog electrical signal, and usually for processing the analog signal to a digitized electrical signal, which can be decoded to data descriptive of the symbol being scanned. The scanning means is operative for scanning either the incident laser beam itself across the symbol, or the field of view of the sensor means, or both.

Sometimes, but not always, decode/control electronic circuitry is provided locally in, or remotely from, the head. The decode/control electronic circuitry is operative for decoding the digitized signal to the aforementioned data, for determining a successful decoding of the symbol, and for terminating the reading of the symbol upon the determination of the successful decoding thereof. The reading is initiated by actuation of a manually-actuable trigger means provided on the head, and operatively connected to, and operative for actuating, the laser beam generating means, scanning means, sensor means, signal processing means, and decode/control means. The trigger means is actuated once for each symbol, each symbol in its respective turn. In a preferred embodiment, the actuation of the trigger means causes the actuation of the decode/control means which, in turn, causes the actuation of the laser beam generating means, scanning means, sensor means and signal processing means.

In conventional usage, the head, which is supported by an operator in his or her hand, is aimed at each symbol to be read, and once the symbol is located, the operator actuates the trigger means to initiate the reading. The decode/control means automatically alerts the operator when the symbol has been read so that the operator can turn his or her attention to the next symbol, and repeat the reading procedure.

As noted above, a keyboard and a display are useful components for such systems. By mounting the display and the keyboard on the head, informational displays and keyboard entry are facilitated at the site of the symbol to be read, rather than at a more remote location away from the head.

Hence, this invention proposes mounting the keyboard at a rear region of the head, and mounting the display at a front region of the head. A window is provided on an intermediate region of the housing between the keyboard and the display. The outgoing laser beam and/or the returning portion of the reflected light pass through the window and travel unobstructedly exteriorly of and past the front region of the head over the display. The placement of the keyboard behind the window and out of the first and second optical paths insures that no fingers or hands of the operator blocks or interferes with the reading of the symbols. The placement of the display ahead of the window does not interfere with symbol reading, nor is the operator's view of the display obscured by the laser beam passing thereover.

To enhance visibility of and access to the keyboard, it is mounted on an inclined upper wall that rises in elevation in a direction from the rear towards the front region of the head. To enhance visibility of the display, it is mounted on a generally planar upper wall of the head without obstructions between the operator's eyes and the display. The window is mounted on a sloped wall that falls in elevation in a direction from the rear towards the front region of the head. This sloped wall enables a direct line-of-sight to be made between the operator's eyes and the display.

A transceiver is mounted on the head to transmit the digitized decoded signals by radio wave transmission to a remote site, and to receive return electrical signals. An antenna is mounted on the head and is electrically connected to the transceiver.

A printer is also mounted on the head. The printer is operative to print labels with either human-readable and/or machine-readable information.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 3 is a rear sectional view as taken along line 3—3 of FIG.1;

FIG. 4 is a cross-sectional view as taken along line 4—4 of FIG. 1;

DETAILED DESCRIPTION OF THE PREFERRED EMBODIMENTS

Figure 1:
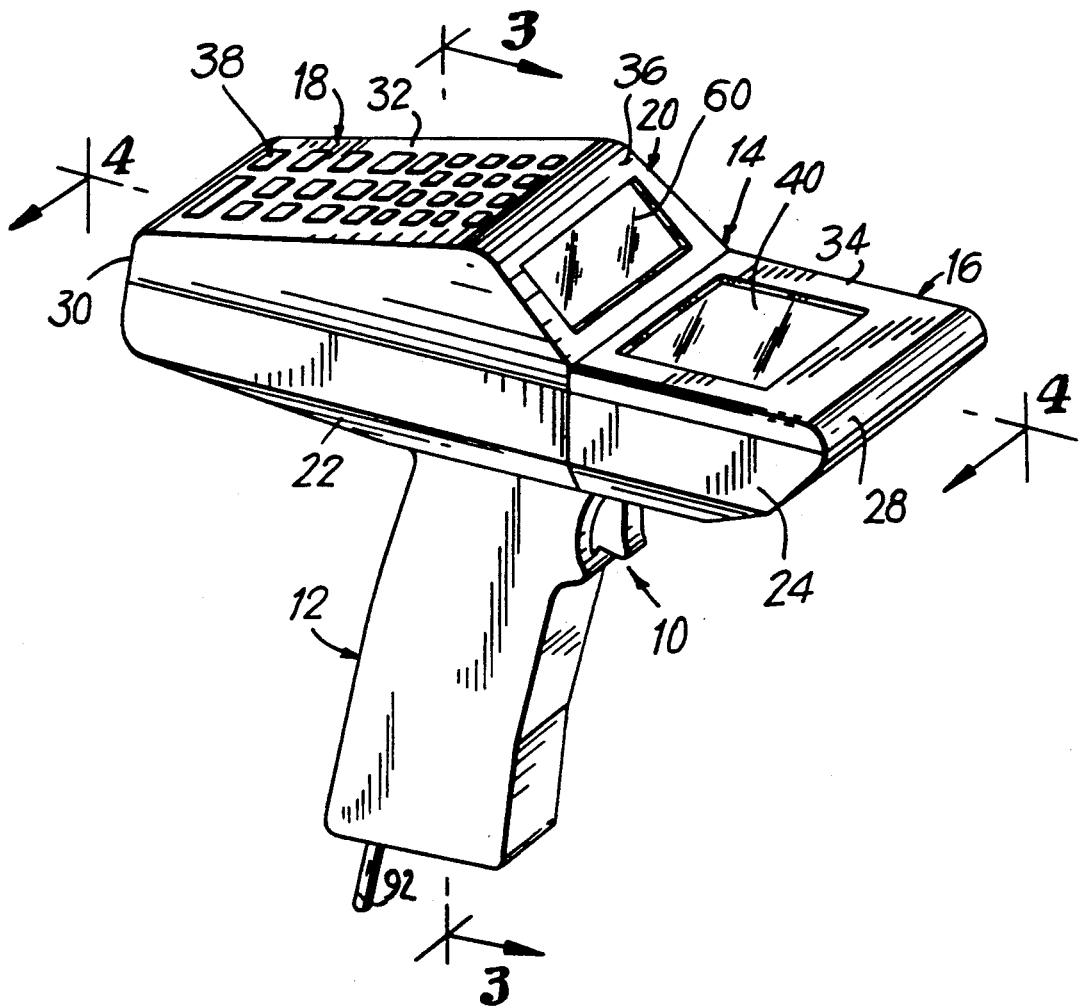
FIG. 1 is a perspective view of a gun-shaped, hand-held laser scanning head in accordance with this invention.
Figure 2:
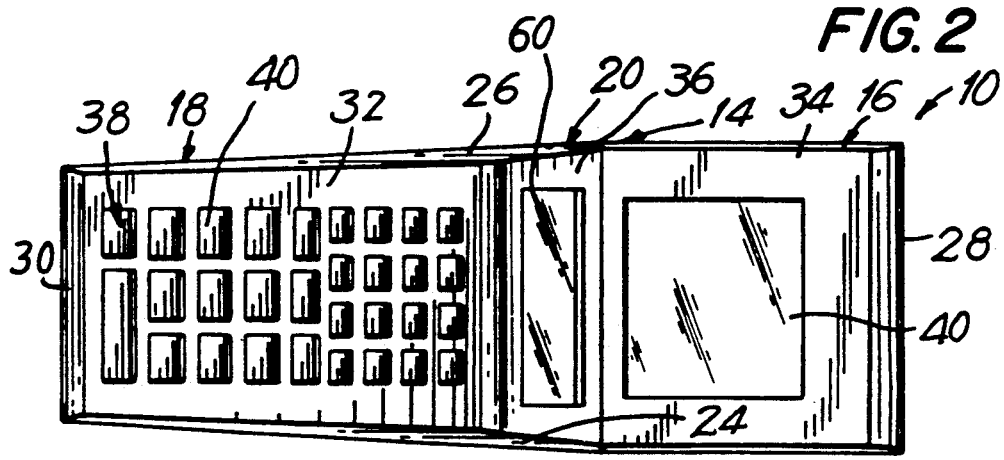
FIG. 2 is a top plan view of the head of FIG. 1.

Referring now to FIGS. 1-5 of the drawings, reference numeral 10 generally identifies a light-weight, narrow-bodied, streamlined, narrow-snouted, handheld, fully portable, easy-to-manipulate, non-arm-and-wrist-fatiguing, laser scanning head supportable entirely by an operator for use in a laser scanning system operative for reading, scanning and/or analyzing bar code symbols throughout the reading thereof. Such symbols comprise a series of bars and spaces of varying widths, which pattern decodes to a multiple-digit representation characteristic of the product bearing the symbol. Typical symbol bar codes in current use are the Universal Product Code (UPC), EAN, Codabar and Code 39.

Turning now to FIG. 1, the head 10 includes a generally gun-shaped housing having a handle portion 12 and an elongated, narrow-bodied barrel or body portion 14. The handle portion 12 has a cross-sectional dimension and overall size such that it can conveniently fit in the palm of a user's hand. Both the body and handle portions are constituted of a light-weight, resilient, shock-resistant, self-supporting material, such as a synthetic plastic material. The plastic housing is preferably injection molded, but can be vacuum-formed or blow-molded to form a thin shell which is hollow and bounds an interior space whose volume measures less than a value which is on the order of 50 cubic inches. The specific value of 50 cubic inches is not intended to be self-limiting, but has been provided merely to give an approximation of the overall maximum volume and size of the head 10. The overall volume can be less than 50 cubic inches and, indeed, in some application, the volume is on the order of 25 cubic inches.

The body portion 14 is generally horizontally elongated along a longitudinal axis, and has a front region 16 at the front end, a rear region 18 at the rear end, and an intermediate body region 20 between the front and rear regions. The body portion 14 has a bottom wall 22, a pair of opposed side walls 24, 26 spaced transversely apart of each other by a predetermined width dimension, a front wall or nose 28, and a rear wall 30 spaced rearwardly of the front wall.

The body portion 14 also has a top wall above the bottom wall 22. The top wall is subdivided into three sections. A first section 32 is located at the rear region 18 and is an inclined wall that rises in elevation as considered in a direction from the rear towards the front region of the housing. A second section 34 is located at the front region 16 and is generally planar wall that lies in a plane generally parallel to the bottom wall 22. A third section 36 is located at the intermediate body region 20 and is a sloped wall that falls in elevation as considered in a direction from the rear towards the front region of the housing. The inclined wall 32 has an upper edge region that merges smoothly into an upper edge region of the sloped wall 36. The sloped wall 36 has a lower linear edge region that lies in the same plane as that of the planar wall 34.

A keyboard 38 having multiple manually depressible keys 40 is mounted on the inclined wall 32 and is readily accessible to the operator. The keys 40 include a plurality of alphanumerical keys and a set of control function keys. The keys 40 are preferably arranged in parallel rows and columns. Programmable function keys are also provided for user customization.

A display 40 having an area screen is mounted on the planar wall 34. The display may be a low power liquid crystal display screen. In a preferred embodiment, the screen has eight lines each having twenty characters and is backlit for clarity and ease of reading. By mounting the display 40 and the keyboard 38 on the head, this feature facilitates keyboard entry and data reading at the site of the symbol to be read, rather than at a more remote location away from the head.

Figure 5:
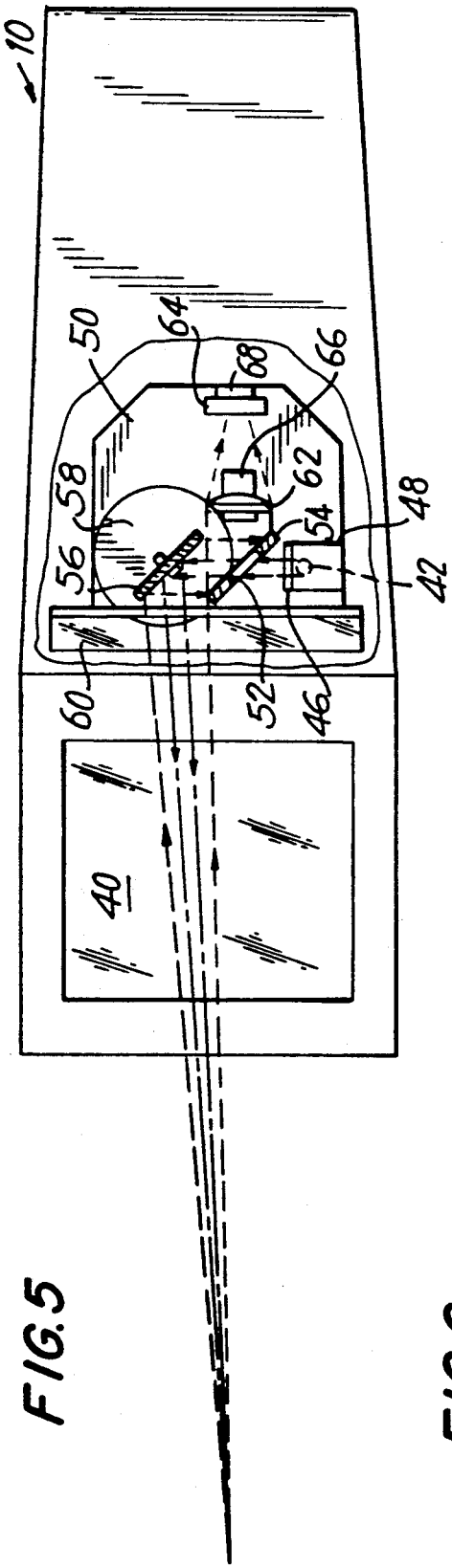
FIG. 5 is a top sectional view as taken along line 5—5 of FIG. 3.

Referring now to FIGS. 3 through 5, a laser light source, e.g., a semiconductor laser diode 42 is operative for generating an incident laser light beam, and for directing the same through an optical train 44 and a light-reflecting mirror 46 adjustably mounted on a bendable bracket 48 which is, in turn, mounted on an optical bench 50. The mirror 46 is positioned in the light path of the incident beam to direct the same from the train 44 towards and through an aperture 52 centrally formed in a sensor mirror 54. The incident beam travels unobstructedly through the aperture 52 and impinges on a scanning mirror 56 of a scanner motor 58. The scanning mirror 56 directs the incident beam through a light-transmissive window 60 mounted in the plane of the sloped wall 36, and out over the front region 16 of the head and the display 40 to a symbol for reflection therefrom.

The motor 58 is operative to sweep the incident beam in any desired scan pattern. The motor described and shown in U.S. Pat. No. 4,387,297 may be used, the entire contents of said patent being incorporated herein by reference and made part of this application.

The exterior transmission of the swept incident beam causes the overall sweep dimension to be substantially independent of the barrel width. The lack of a direct relationship between the size of the swept incident beam and the barrel width includes the possibility that the overall sweep dimension may be greater or smaller than the barrel width. Of course, if desired, the incident beam may be swept over a field of view larger than the barrel width.

Likewise, light reflected off the symbol travels outside of and past the front region 16 and the display 40, and passes through the same window 60 for impingement on the scanning mirror 56.

The scanner motor 58 also sweeps the field of view of the reflected light over an overall sweep dimension which is less, but which could be greater, than the barrel width. The sensor mirror 54 is positioned in the light path of the reflected light such that the light-reflecting portions of the mirror 54 bounding the aperture 52 reflect the reflected light rearwardly towards a sensor lens 62 and, in turn, to a light sensor 64. The lens 62 and the sensor 64 are both mounted on respective brackets 66, 68 on the optical bench 50.

It will be noted that both the incident beam and the reflected light are swept and travel through the same window 60, thereby constituting a retro-reflective-type scan head.

The sensor 64, preferably a photodiode, detects the variable intensity of the collected laser light over a field of view which extends along, and preferably beyond, the symbol, and generates an electrical analog signal indicative of the detected variable light intensity.

Also mounted in the head is signal processing means 70 mounted on a circuit board 72, and operative for processing the analog electrical signal generated by the photodiode 64 into a digitized video signal. Data descriptive of the symbol can be derived from the video signal. Suitable signal processing circuitry for this purpose was described in U.S. Pat. No. 4,251,798. Other components within the head include drive circuitry 74 for the motor 58, a voltage converter 76 for converting incoming voltage, e.g., from batteries 78, 80, to a regulated voltage suitable for energizing the laser diode 42, a display driver 82 for energizing the display 40, and a decode/control means 84 operative for decoding the digitized video signal to a digitized decoded signal from which the desired data descriptive of the symbol is obtained in accordance with an algorithm contained in a software control program in a microprocessor 86. The decode/control means includes a PROM for holding a control program, and a RAM for temporary data storage. The decode/control means 84, together with the micro-processor 86, determine when a successful decoding of the symbol has been obtained, and also terminates the reading of the symbol upon the determination of the successful decoding thereof. The initiation of the reading is caused by depression of a trigger 88. The decode/control means also includes control circuitry for controlling the actuation of the actuatable components in the head, namely, the laser diode 42, the photodiode 64, the motor 58, and all the other electronic subcircuits therein, as initiated by the trigger 88, as well as for communicating with the user that the reading has been automatically terminated as, for example, by sending a control signal to the display 40, or by energizing a buzzer or beeper.

The decoded signal is either conducted along a conductor within a cable interconnected between the head and a remote host computer 90, or is transmitted by radio wave from the head to the computer 90 by means of antenna 92. The computer 90 serves essentially as a large data base, may be an in-store processor, stores the decoded signal, and provides information related to the decoded signal. For example, the host computer, in accordance with this invention, can provide retail price information on an updated basis corresponding to the products identified by their decoded symbols. The host computer can advantageously be incorporated in a portable terminal, or in a stationary terminal such as a cash register.

Radio wave transmission from the head is performed by a transceiver 94 mounted on a circuit board 96. Either the digitized video signal or the digitized decoded signal is transmitted, preferably after first being modulated by a frequency shift key modulator 98, to the computer 90. The transceiver 94 also receives return electrical signals from the computer 90. The information contained in the return signals can be displayed on the display 40.

The radio wave transmission and reception are based on spread spectrum technology, which does not require Federal Communications Commission licensing approval, because it operates in the 902 MHz to 928 MHz range. Spread spectrum technology uniformly distributes data over a frequency range much larger than that normally required for robust data transmission. By spreading a data signal in the frequency domain, the signal gains significant redundancy, which allows data to be recovered even in the presence of interfering signals such as noise and signal tones.

In the preferred embodiment, data is transmitted at 60 kilobits per second in operating ranges of 500 to 2,000 feet. For extended ranges, up to 62 RF base stations can be configured to allow terminals to operate in a cellular fashion with communication passed transparently from base station to base station as the user operating the terminal moves freely throughout a warehouse or factory floor. Base stations communicate with the host computer via standard high-speed 115,000 bps serial ports. Spread spectrum technology features subsecond performance even in networks consisting of hundreds of terminals and offers a cost-effective method for wireless transmission of data.

The head also contains a printer 100 that includes a thermal printhead 102 operative for thermally imprinting graphical markings on a journaled roll 104 of paper labels, each printed label being torn off the roll by being urged against tear-off edge 106 at the front of the head. The label preferably has a pressure-adhesive backing so that it can be applied directly on the product, either as an original label or adjacent to, or preferably as an overlay to, an existing label on the product.

In a preferred embodiment, the printer prints bar codes at a rate of 1.5 inches per second on labels that are 1.5 inches wide and up to eight inches long. All major bar code symbologies can be printed, together with a graphics capability for producing backgrounds, logos, or specific designs. Bar codes can be printed vertically or horizontally, in "ladder" or "picket-fence" style. Alphanumeric characters may be rotated in angular increments. The printer can be mounted off-board, in a separate housing that can be worn over the shoulder and plugged into the head.

Figure 6:
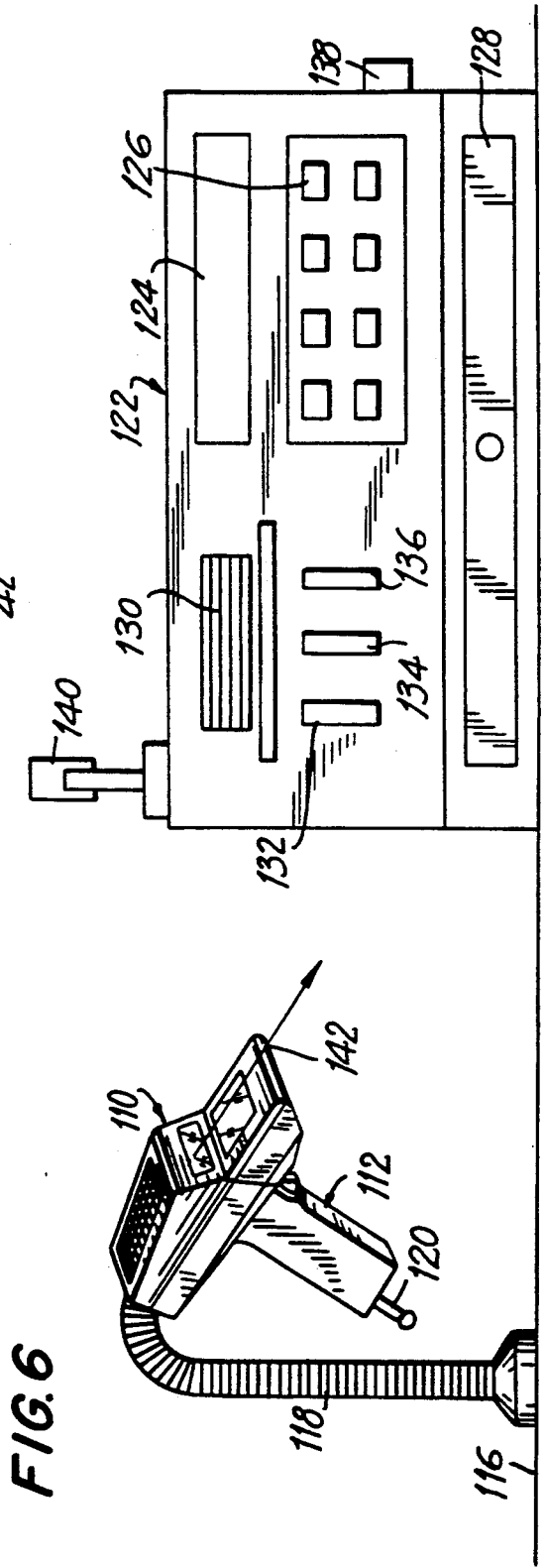
FIG. 6 is a part perspective, part diagrammatic view of a laser scanning workstation in accordance with this invention.

Turning now to FIG. 6, most or all of the components shown within the hand-held head 10 of FIG. 1 can be mounted within a workstation 110 having a head 112, a base 114 supported on a countertop or like support surface 116, and an adjustable gooseneck-like conduit or arm 118, one end of which is connected to the head 112, and the opposite end of which is connected to the base 114. The trigger 88 can be eliminated. The arm 118 is hollow so that electrical wires can be routed therethrough to conduct electrical signals to and away from the components within the head 112. The arm is constituted of a semi-rigid, metal material capable of being repeatedly manually bent to a selected orientation and, when so bent, capable of staying in said selected orientation until re-bent by an operator to another orientation. By bending the arm, the head 112 is infinitely adjustably positioned relative to a symbol located in the vicinity of a work surface exteriorly of the scanner. The work surface or reference plane can be located at, or slightly above, the plane of the countertop 116.

Rather than using electrical wires, an antenna 120 can work with an on-board transceiver, as described above, to communicate with a terminal 122 which is shown, for convenience, as a cash register in a point-of-sale installation. The terminal 122 has a display 124 for displaying information, including data descriptive of the symbol being scanned, to an operator; a keyboard 126 for enabling the operator to manually enter information, including data descriptive of the symbol being scanned; a cash drawer 128 for holding money; a paper tape 130 for recording information and providing a receipt to a customer of the purchase of an object bearing the symbol being scanned; a recharger 132 for recharging and supplying electrical power to a battery mounted either within the base 114 or the head 112; a decode module 134 (in case the decode module is not located within the base 114, arm 118, or head 112); and a data base 136 of a host computer. A connector 138 can be used to download the stored data to another data base. An antenna 140 communicates with the antenna 120.

The entire installation shown in FIG. 6 is known as an intelligent workstation. The arm 118 can be manipulated with multiple degrees of freedom of movement to insure that the exiting laser beam (depicted by the arrow 142) strikes the symbol and/or the returning reflected light is collected from the symbol.

It will be understood that each of the elements described above, or two or more together, also may find a useful application in other types of constructions differing from the types described above.

While the invention has been illustrated and described as embodied in a portable scanner with an on-board keyboard, display, transceiver and printer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a scanning system for reading indicia having parts of different light reflectivity, a scanning head comprising:
   (a) a housing having an elongated body portion including a front region, a rear region, and an intermediate body region extending between the front and rear regions;
   (b) indicia-detection means for generating a light beam directed along a light path toward indicia to be read, and for receiving reflected light from the indicia to produce electrical signals representative of the indicia;
   (c) a keyboard disposed on the rear region of the housing out of the light path for enabling manual data entry without manually blocking the light beam;
   (d) a display disposed on the front region of the housing for displaying information;
   (e) window means mounted on the intermediate body region of the housing between the keyboard and the display, said window means being light-transmissive and configured and positioned in the light path of the light beam to permit the light beam to pass through and window means and unobstructedly travel exteriorly of and past the front region of the housing over the display; and
   (f) read-control means for actuating the indicia-detection means to initiate reading of an indicium.

2. The head as recited in claim 1; and further comprising a handle connected to the housing for enabling an operator to hold the housing during reading.

3. The head as recited in claim 2, wherein the rear region has an inclined wall on which the keyboard is mounted to lie within ready access of the operator.

4. The head as recited in claim 3, wherein the inclined wall rises in elevation as considered in a direction from the rear towards the front region of the housing.

5. The head as recited in claim 1, wherein the keyboard has multiple keys.

6. The head as recited in claim 2, wherein the front region has a generally planar wall on which the display is mounted to lie along a direct line-of-sight of the operator.

7. The head as recited in claim 1, wherein the display includes a screen having a predetermined area.

8. The head as recited in claim 2, wherein the window means includes a window mounted on a sloped wall that falls in elevation as considered in a direction from the rear towards the front region of the housing.

9. The head as recited in claim 1, wherein the housing has side walls spaced transversely apart of each other by a predetermined width, and wherein the exterior transmission of the light beam is independent of the predetermined width of the housing.

10. The head as recited in claim 1, wherein the indicia-detection means includes a laser source for generating an incident laser beam, sensor means for detecting the variable intensity of laser light reflected from the indicium over a field of view, and scanning means for scanning at least one of said incident laser beam and said field of view.

11. The head as recited in claim 1; and further comprising transceiver means in the housing, for transmitting the electrical signals to a remote site, and for receiving return electrical signals from the remote site.

12. The head as recited in claim 2, wherein the read-control means includes a manually actuatable trigger switch mounted on the handle.

13. The head as recited in claim 1; and further comprising printer means in the housing, for printing data.

14. In a scanning system for reading indicia having parts of different light reflectivity, a scanning head comprising:
   (a) a generally gun-shaped housing having an elongated body portion including a front region, a rear region, and an intermediate body region extending between the front and rear regions, and a handle portion connected to the body portion to enable an operator to hold the housing and aim the body portion at the indicia located at a distance from the front region of the housing;
   (b) indicia-detection means for generating a light beam directed along a light path toward indicia to be read, and for receiving reflected light from the indicia to produce electrical signals representative of the indicia;
   (c) a keyboard disposed on the rear region of the housing out of the light path, for enabling the operator to manually enter data without manually blocking the light beam, said keyboard being located within ready reach of the operator;
   (d) a display disposed on the front region of the housing, for displaying information, said display being located within ready viewing by the operator during indicia reading;
   (e) window means mounted on the intermediate body region of the housing between the keyboard and the display, said window means being light-transmissive and configured and positioned in the light path of the light beam to permit the light beam to pass through the window means and unobstructedly travel exteriorly of and past the front region of the housing over the display; and (f) read-control means for actuating the indicia-detection means to initiate reading of an indicium.

15. The head as recited in claim 14, wherein the housing has a top wall having a front section, a rear section and an intermediate section; and wherein the display, the keyboard and the window means are all mounted on the top wall at said front, rear and intermediate sections, respectively.

16. The head as recited in claim 15, wherein the rear section rises in elevation as considered in a direction from the rear toward the front region of the housing, and wherein the intermediate section falls in elevation as considered in the direction from the rear toward the front region of the housing, and wherein the front section has a generally constant elevation.

17. The head as recited in claim 14, wherein the keyboard has a plurality of manually depressable keys all mounted rearwardly of the window means to enable key depression even during reading without manually blocking the light beam.

18. The head as recited in claim 14, wherein the indicia-detection means includes a laser light source for generating a laser light beam.

* * * * *